US010762296B2

(12) United States Patent
Sun

(10) Patent No.: US 10,762,296 B2
(45) Date of Patent: *Sep. 1, 2020

(54) RISK ADDRESS IDENTIFICATION METHOD AND APPARATUS, AND ELECTRONIC DEVICE

(71) Applicant: Alibaba Group Holding Limited, George Town, Grand Cayman (KY)

(72) Inventor: Qingqing Sun, Zhejiang (CN)

(73) Assignee: Alibaba Group Holding Limited, George Town, Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 16/592,895

(22) Filed: Oct. 4, 2019

(65) Prior Publication Data
US 2020/0034426 A1 Jan. 30, 2020

Related U.S. Application Data

(63) Continuation of application No. PCT/CN2018/093791, filed on Jun. 29, 2018.

(30) Foreign Application Priority Data
Jul. 5, 2017 (CN) .......................... 2017 1 0543805

(51) Int. Cl.
*G06F 40/00* (2020.01)
*G06F 40/289* (2020.01)
(Continued)

(52) U.S. Cl.
CPC ............ *G06F 40/289* (2020.01); *G06F 40/30* (2020.01); *G06N 7/005* (2013.01); *G06N 20/10* (2019.01); *G06Q 30/0601* (2013.01)

(58) Field of Classification Search
CPC ...... G06N 20/00; G06F 40/30; G06K 9/6256; G06K 9/00442; G06Q 10/0631;
(Continued)

(56) References Cited

U.S. PATENT DOCUMENTS 10,529,329 B2 * 1/2020 Kim ........................ G10L 15/22
2004/0215458 A1 * 10/2004 Kobayashi .............. G10L 15/06
704/251
(Continued)

FOREIGN PATENT DOCUMENTS

CN 103220302 A 7/2013
CN 103810425 A 5/2014
(Continued)

OTHER PUBLICATIONS

International Search Report of Application No. PCT/CN2018/093791, dated Oct. 10, 2018.
Extended European Search Report for Application No. 18827964.0 dated Apr. 1, 2020.

*Primary Examiner* — Edgar X Guerra-Erazo
(74) *Attorney, Agent, or Firm* — Finnegan, Henderson, Farabow, Garrett & Dunner, L.L.P.

(57) ABSTRACT

Embodiments of the specification disclose a risk address identification method and apparatus, and an electronic device. The risk address identification method includes: acquiring an address word sequence corresponding to an input address; determining an address word in the address word sequence, the determined address word matching a risk word corresponding to a risk address; generating an observation sequence corresponding to the address word sequence according to the determined address word; processing the observation sequence using a hidden Markov model obtained based on semantics learning before and after address words, to obtain a decision vector, wherein the decision vector represents probabilities of the risk address
(Continued)

being matched by address words contained in the address word sequence; and identifying whether the input address is a risk address by making a classification decision on the decision vector.

23 Claims, 9 Drawing Sheets

(51) Int. Cl.
*G06N 20/10* (2019.01)
*G06F 40/30* (2020.01)
*G06N 7/00* (2006.01)
*G06Q 30/06* (2012.01)

(58) Field of Classification Search
CPC . G10L 2015/223; G10L 15/26; G10L 15/265; G10L 15/30; G10L 15/00; G10L 15/197; G10L 15/28; G10L 13/027
See application file for complete search history.

(56) References Cited

U.S. PATENT DOCUMENTS

| | | | |
|---|---|---|---|
| 2007/0083374 A1* | 4/2007 | Bates | G10L 15/197 704/257 |
| 2008/0034073 A1 | 2/2008 | McCloy et al. | |
| 2009/0313017 A1* | 12/2009 | Nakazawa | G10L 15/065 704/244 |
| 2012/0016663 A1* | 1/2012 | Gillam | G06F 16/90344 704/9 |
| 2012/0102002 A1* | 4/2012 | Sathyanarayana | G06F 16/215 707/687 |
| 2013/0282645 A1* | 10/2013 | Culbertson | G06F 40/232 706/52 |
| 2014/0298460 A1 | 10/2014 | Xue et al. | |

FOREIGN PATENT DOCUMENTS

| | | |
|---|---|---|
| CN | 104504940 A | 4/2015 |
| CN | 104766014 A | 7/2015 |
| CN | 105447204 A | 3/2016 |
| CN | 105574146 A | 5/2016 |
| CN | 104217160 A | 12/2017 |

* cited by examiner

Standardized input address: REPUBLICA DE SIRIA 7495 SANTA FE SANTA FE AR

Initial labeling vector:
```
REPUBLICA DE SIRIA 7495 SANTA FE SANTA FE AR
[    0     0    1    0     0   0    0   0  0]
```

Decision vector:
```
REPUBLICA DE  SIRIA 7495 SANTA  FE SANTA FE AR
[  0.01   0.02 0.02 0.02  0.01  0    0   0  0]
```

RISK ADDRESS IDENTIFICATION METHOD AND APPARATUS, AND ELECTRONIC DEVICE

CROSS-REFERENCE TO RELATED APPLICATIONS

This application is a continuation application of International Application No. PCT/CN2018/093791, filed on Jun. 29, 2018, which is based upon and claims priority to Chinese Patent Application No. 201710543805.4, filed on Jul. 5, 2017, the entire content of all of which is incorporated herein by reference.

TECHNICAL FIELD

The specification relates to the field of computer technologies, and in particular to a risk address identification method and apparatus, and an electronic device.

TECHNICAL BACKGROUND

Online financial transactions are becoming more and more developed, and some users unlawfully use online finance to conduct illegal money operations, such as money laundering. In order to prevent the occurrence of illegal online financial transactions, there are already some solutions for identifying risk addresses, which are generally solutions targeted at identifying relatively regular risk addresses.

For example, word segmentation and labeling may be performed on an input address using a word segmentation algorithm, and finally address word matching is performed one by one according to the labeled information of different address words, so as to identify whether the input address is a risk address through the matching result.

Based on the prior art, a more accurate risk address identification solution is needed.

SUMMARY

The embodiments of the specification provide a risk address identification method and apparatus, and an electronic device, for solving the technical problem that a more accurate risk address identification solution is needed.

In an embodiment, a risk address identification method comprises: acquiring an address word sequence corresponding to an input address; determining an address word in the address word sequence, the determined address word matching a risk word corresponding to a risk address; generating an observation sequence corresponding to the address word sequence according to the determined address word; processing the observation sequence using a hidden Markov model obtained based on semantics learning before and after address words, to obtain a decision vector, wherein the decision vector represents probabilities of the risk address being matched by address words contained in the address word sequence; and identifying whether the input address is a risk address by making a classification decision on the decision vector.

In an embodiment, a risk address identification apparatus comprises: a receiving module for acquiring an address word sequence corresponding to an input address; a matching module for determining an address word in the address word sequence, the determined address word matching a risk word corresponding to a risk address; a generation module for generating an observation sequence corresponding to the address word sequence according to the determined address word; a labeling module for processing the observation sequence using a hidden Markov model obtained based on semantics learning before and after address words, to obtain a decision vector, wherein the decision vector represents probabilities of the risk address being matched by address words contained in the address word sequence; and an identification module for identifying whether the input address is a risk address by making a classification decision on the decision vector.

In an embodiment, an electronic device comprises: a processor; and a memory for storing instructions executable by the processor; wherein the processor is configured to: acquire an address word sequence corresponding to an input address; determine an address word in the address word sequence, the determined address word matching a risk word corresponding to a risk address; generate an observation sequence corresponding to the address word sequence according to the determined address word; process the observation sequence using a hidden Markov model obtained based on semantics learning before and after address words, to obtain a decision vector, wherein the decision vector represents probabilities of the risk address being matched by address words contained in the address word sequence; and identify whether the input address is a risk address by making a classification decision on the decision vector.

In an embodiment, a computer-readable storage medium stores thereon instructions that, when executed by a processor of a device, cause the device to perform the above risk address identification method.

The above-mentioned technical solutions can achieve the following beneficial effects: using a hidden Markov model obtained based on semantics learning before and after address words and a support vector machine model to obtain a classification determination result of an input address according to an address word obtained after processing the input address and the semantics before and after the address word, so that a risk address can be identified more accurately.

BRIEF DESCRIPTION OF THE DRAWINGS

The accompanying drawings, which are incorporated in and constitute a part of this specification, illustrate embodiments and, together with the description, serve to explain the principles of the specification.

DETAILED DESCRIPTION

Embodiments of the specification provide a risk address identification method and apparatus, and an electronic device.

In order to make those skilled in the art better understand the technical solutions in the specification, the technical solutions in the embodiments of the specification will be clearly and completely described below in conjunction with the accompanying drawings. The described embodiments are exemplary, but not all embodiments consistent with the specification.

Figure 1:
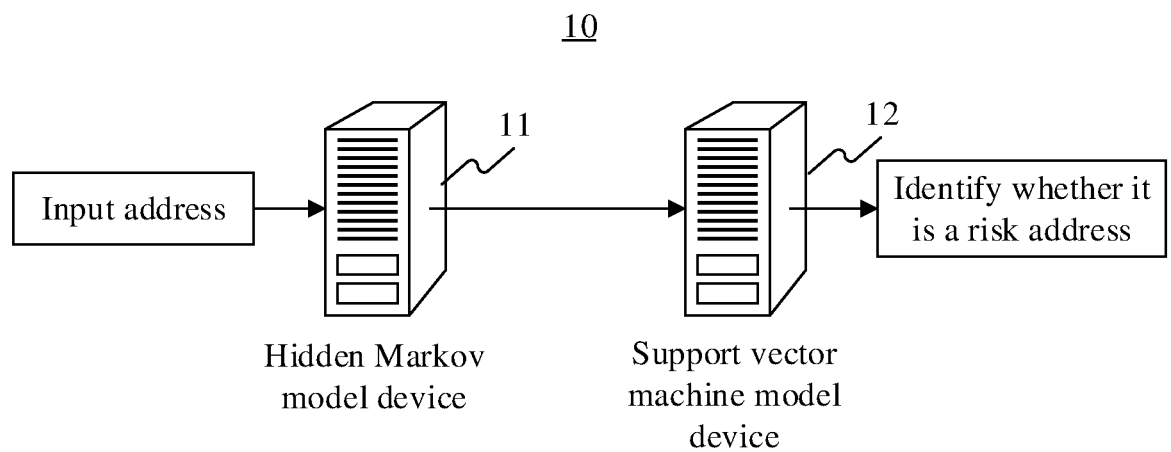
FIG. 1 is a schematic diagram of an overall architecture for risk address identification, according to an embodiment.

FIG. 1 is a schematic diagram of an overall architecture 10 for risk address identification, according to embodiments of the specification. In the overall architecture 10, an address is firstly input and processed by a device 11 containing a Hidden Markov Model (HMM) to obtain a decision vector corresponding to the input address, then the decision vector is further processed by a device 12 containing a Support Vector Machine (SVM), and finally, whether the input address is a risk address is determined. Although shown as two separated devices in FIG. 1, the device 11 and the device 12 may also be implemented with one device or more than two devices.

Based on the overall architecture 10, the solution of the specification will be described in detail below.

Figure 2:
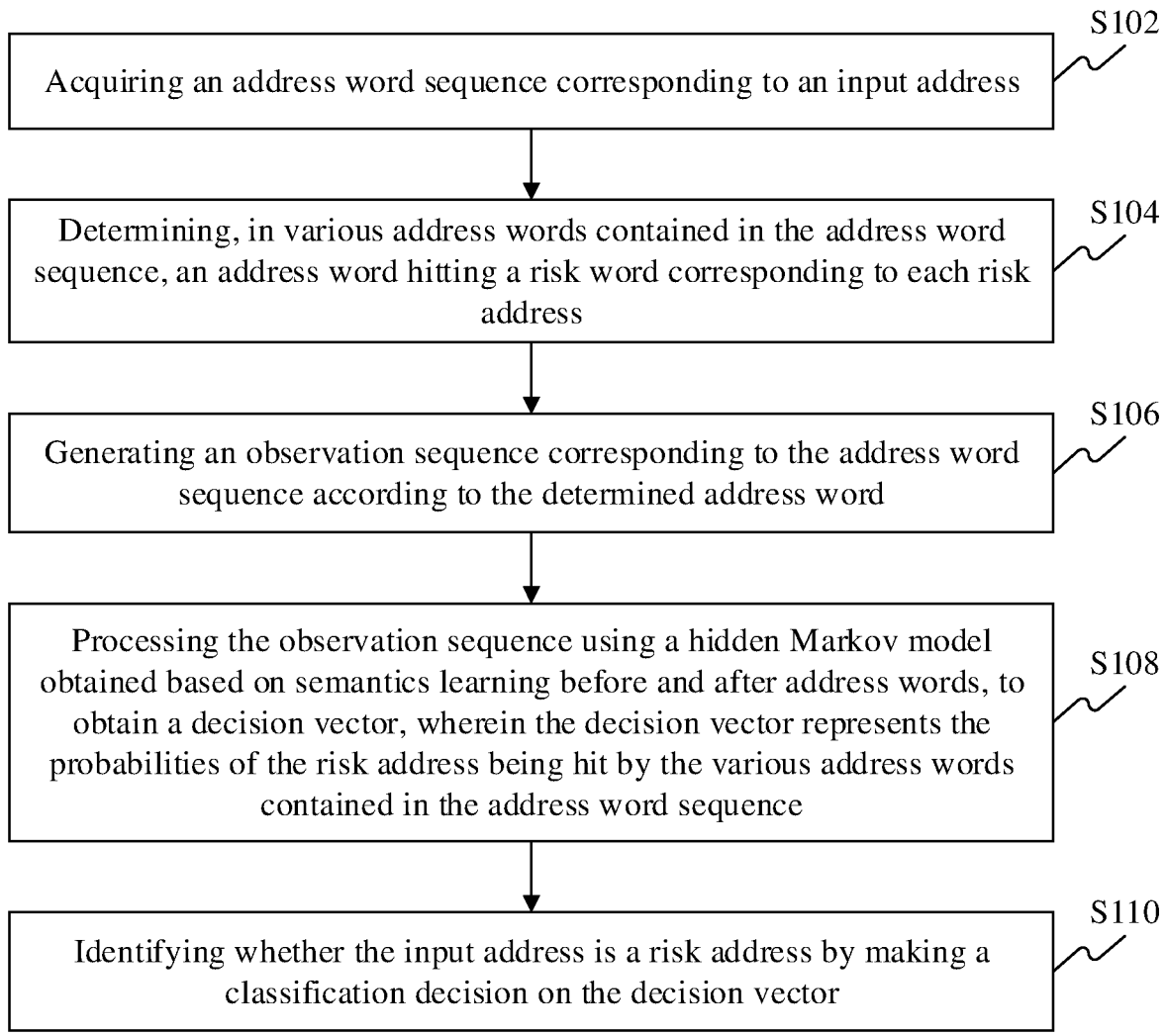
FIG. 2 is a flowchart of a risk address identification method, according to an embodiment.

FIG. 2 is a flowchart of a risk address identification method 100, according to an embodiment. Referring to FIG. 2, the method 100 may include the following steps.

In step S102, an address word sequence corresponding to an input address is acquired.

The address word sequence can be obtained after processing the input address.

For example, if the input address contains many interference characters, an interference character removing operation can be firstly performed on the input address, and then an address word sequence is further obtained. The address word sequence may also be the input address itself if the input address includes word separators such as spaces, or if the processing ability, for excluding interference characters, of the risk address identification in the subsequent steps is good.

In step S104, an address word hitting a risk word corresponding to each risk address is determined in various address words contained in the address word sequence.

For example, the various risk addresses may be a risk address library composed of multiple risk addresses.

Also for example, a risk word may be a risky address word contained in the risk address. The risk address may contain one or more risk words, and these risk words may constitute the risk address sequentially according to a certain rule or may be relatively independent.

The method for determining hitting may, for example, comprise: respectively scanning each address word in the address word sequence and matching the scanned address word with each address word in the risk address, and determining the scanned address word as a hit address word if the scanned address word matches an address word in the risk address.

For example, if an address word sequence contains multiple address words, and an address word A in the address sequence matches and hits a risk word a contained in a risk address, the address word sequence can be represented as one multi-dimensional vector, with each dimension of the vector respectively corresponding to one address word in the address word sequence; further, the dimension, in the vector, corresponding to the address word A can be determined by scanning, and the dimension is labeled as 1 to determine that the address word A is hit; and for the other address words that are not hit, the corresponding dimensions are labeled as 0.

In step S106, an observation sequence corresponding to the address word sequence is generated according to the determined address word.

There are many ways of generating an observation sequence corresponding to the address word sequence: each of required address words can be obtained from the address word sequence according to the determined address word and the semantics before and after it, and an observation sequence is generated according to the determined address word and the obtained address words, wherein the obtained address words may be continuous address words, and may also be discontinuous address words that conform to a certain rule;

The way of generating an observation sequence corresponding to the address word sequence may also be: first splitting the address word sequence to obtain a plurality of address word sub-sequences, and then generating an observation sequence according to required address word sub-sequence.

In step S108, the observation sequence is processed using a hidden Markov model obtained based on semantics learning before and after address words, to obtain a decision vector, wherein the decision vector represents probabilities of the risk address being hit by the various address words contained in the address word sequence.

The semantics before and after address words may be associated semantics of address words before and after, and associated with, a current address word, and the current address word, and the number of associated address words may be, e.g., two or three, wherein the associated address words may be either address words adjacent to the current address word or address words spaced apart from the current address word by at least one word.

For example, the above-mentioned current address word may be the determined address word in step S106. The semantics before and after the address word may be that the address words before and after, and adjacent to, the determined address word serve as the semantics before and after the address word. In the example of Chaoyang District, Beijing, China, the semantics before and after Beijing includes China and Chaoyang District. In another example, address words, in the address word sequence, not adjacent to each other may be used as the semantics before and after the determined word.

Further, in order to simplify processing steps, an observation sequence may also be an address word sequence or an input address itself. In this case, the probability of hitting the risk address can be labeled directly based on the hit address word and the semantics before and after it according to a labeling result of the hit address word in the address word sequence or the input address.

In step S110, whether the input address is a risk address is identified by making a classification decision on the decision vector.

The classification decision may be a binary classification decision made on the decision vector. For example, one class may be a decision vector corresponding to a risk address, and the other class may be a decision vector corresponding to a non-risk address. Further, whether the input address corresponding to the decision vector is a risk address may be determined.

In the embodiments of the specification, for step S102, acquiring an address word sequence corresponding to an input address may specifically comprise: receiving an input address; and performing data cleaning processing and word segmentation processing on the input address to obtain an address word sequence corresponding to the input address.

The method of the data cleaning processing may comprise: removing an interference character from the input address to obtain a standardized address character string; or adjusting the arrangement order of various address words in the input address.

The method of the word segmentation processing may comprise: segmenting the standardized address character string using a specific character such as a space or a semicolon, to obtain an address word sequence corresponding to the input address.

As mentioned above, if the input address contains many interference characters, an interference character removing operation can be firstly performed on the input address, and then an address word sequence is further obtained.

For example, first, data cleaning is performed on some interference characters existing in an input address to remove the interference characters, wherein the interference characters may, for example, include at least one of the following: extra spaces, half-width characters, "|", ":", "~", etc., and the cleaned input address can be, for example, a standardized address character string separated by spaces; then, word segmentation labeling is performed: the cleaned address character string is segmented by spaces, auxiliary words, such as of and the, appearing in the address character string are labeled lexicographically, and these auxiliary words often can be not used in subsequent address matching and identification; and finally, an address word sequence composed of address words is obtained after the word segmentation labeling. After performing cleaning and word segmentation on the input address, an address word sequence is obtained, so that quick, efficient and accurate operations such as identification of risk address words can be performed on the address word sequence subsequently.

As mentioned above, the address word sequence may also be the input address itself if the input address includes word separators such as a space, or if the processing ability, for excluding interference characters, of the risk address identification in the subsequent steps is good; as such, the step of processing the input address can be omitted.

In the embodiments of the specification, for step S104, determining, in various address words contained in the address word sequence, an address word hitting a risk word corresponding to each risk address may specifically comprise: respectively matching the various address words in the address word sequence using risk words corresponding to each risk address; and if one of the address words is successfully matched, labeling that address word and determining that address word as an address word hitting a risk word corresponding to each risk address.

The labeling may be: correspondingly labeling, with a number or a character, a matching result of various address words in the address word sequence respectively, including labeling a result indicating hitting and labeling a result indicating not hitting after the matching in the address word sequence, and composing a labeling vector together by these numbers or characters indicating the labeling results.

For example, an address word sequence or various address words in an observation sequence corresponding to the address word sequence is globally scanned, matched, and labeled, and if the second address word A in the address word sequence matches an address word a in an address word set corresponding to a risk address, then the address word A is labeled as 1, otherwise the address word A is labeled as 0. Further, a labeling vector is obtained, which may also be referred to as an initial labeling vector, such as [0, 0, 1, 0, 0, 0].

The various address words in the address word sequence are respectively matched, and the specific matching method may comprise: performing global risk address scanning and matching on the address word sequence (e.g., risk address information includes countries, regions, and major cities), wherein the matching algorithms used may, for example, include a character string similarity matching algorithm, a pronunciation similarity matching algorithm, and an editing distance matching algorithm, etc.

Further, determining, in various address words contained in the address word sequence, an address word hitting a risk word corresponding to each risk address further comprises: if there is no successfully matched address word, determining that the input address is not a risk address.

If various address words in a certain address word sequence do not match risk words in the risk addresses, then it can be considered that the address word sequence does not contain a risk word, and correspondingly the probability that the input address is not a risk address is greater, so further operations on the input address can be ended.

In the embodiments of the specification, for step S106, generating an observation sequence corresponding to the address word sequence according to the determined address word may specifically comprise: for the determined address word, respectively performing the following: generating an observation sequence corresponding to the address word sequence according to the address word and associated words of the address word in the address word sequence, wherein the associated words reflect the semantics before and after the address word in the address word sequence.

If the address word sequence contains a plurality of address words determined at step S104, a plurality of corresponding observation sequences may be generated, and it may also be chosen to generate an observation sequence corresponding to one of the determined address words. An associated word can be understood as a word that has a certain logical relationship or a specific association relationship with words before and after it, or a word artificially defined to produce an association relationship with words before and after it. Generally, the associated words are adjacent to the current word, for example they can be two words before or after, and adjacent to, the current word.

In the embodiments of the specification, a hidden Markov model can be obtained in advance based on the semantics learning before and after address words.

Figure 3:
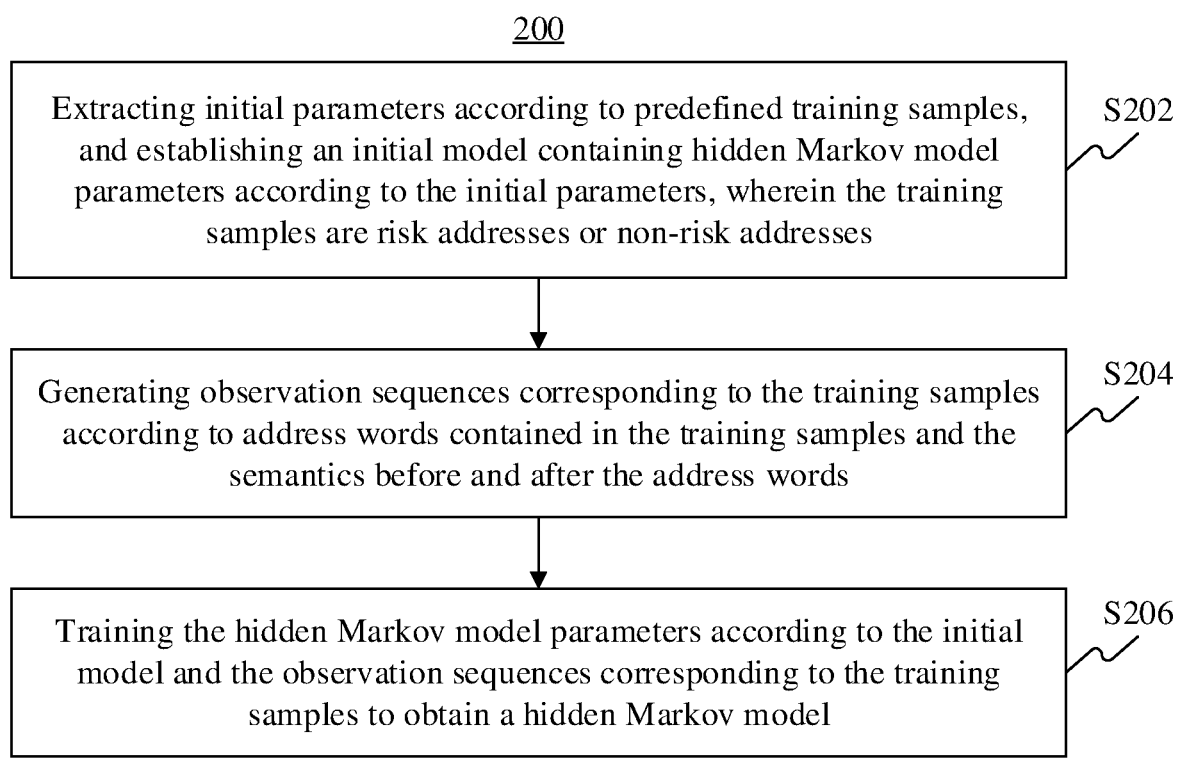
FIG. 3 is a flowchart of a modeling method for a hidden Markov model, according to an embodiment.

FIG. 3 is a flowchart of a modeling method 200 for a hidden Markov model, according to an embodiment. Referring to FIG. 3, the method 200 may include the following steps.

Step S202: extracting initial parameters according to predefined training samples, and establishing an initial model containing hidden Markov model parameters according to the initial parameters, wherein the training samples are risk addresses or non-risk addresses;

Step S204: generating observation sequences corresponding to the training samples according to address words contained in the training samples and the semantics before and after the address words; and Step S206: training the hidden Markov model parameters according to the initial model and the observation sequences corresponding to the training samples to obtain a hidden Markov model.

The training samples include positive samples and negative samples; a risk address can be a positive sample, and a non-risk address can be a negative sample. By training the hidden Markov model with positive and negative samples, a better training effect can be achieved.

In an embodiment, the negative samples may be the addresses of 235 non-sanction countries or regions in the whole world, and the positive samples may be address data for all sanction countries and regions. It should be noted that, in general, a risk address contains a risk word, and a non-risk address may also contain a risk word.

The address words in step S204 may be address words, which match the risk words corresponding to the risk addresses, in the training samples. In a predefined sample address, whether the sample address contains a risk word and which address word is a risk word have been labeled in advance. Here, the sample address is a training sample address contained in the training samples.

In an embodiment, a required observation sequence is extracted according to the labeled address word in the sample address and the semantics before and after it; and generally, 2 or 3 words before and after and associated with the labeled address word are selected as the semantics before and after the address word, which all together form the observation sequence.

In an embodiment, according to the obtained initial labeling model and observation sequence, hidden Markov model parameters are trained until appropriate hidden Markov model parameters are obtained, and then a needed hidden Markov model is determined according to the hidden Markov model parameters obtained through the training.

In the modeling method 200, the quantity and scale of training sample addresses may affect the quality of the training result. When the address library used for the training sample addresses is more comprehensive and has a wider coverage, it is advantageous to improve the accuracy of the identification of the model, and therefore, the method 200 can achieve a great modeling effect in the case of having enough training sample addresses.

In an embodiment, the initial parameters include: an initial probability vector $\pi_i$, a state transition matrix, $a_{ij}$, and the like; and extracting initial parameters according to predefined training samples may specifically comprise: based on the training samples, obtaining an initial probability vector by respectively performing probability labeling on the address words contained in the training samples; and obtaining a state transition matrix of the sample addresses according to state transition probabilities, between a risk word and a non-risk word, of the address words contained in the training samples. Here, a risk word is an address word contained in a risk address, a non-risk word is an address word contained in a non-risk address, and some address words can be both risk words and non-risk words.

There may be a plurality of training samples. Generally, each training sample may be a sample address. When probability labeling is performed, a sample address is selected from the set as a training sample; for example, after probability labeling is performed on address words in a certain sample address, the second address word in the sample address is a hit address word, and an initial probability vector $\pi_i$=10, 1, 0, 0, 0, 01 is obtained, where 1 represents a hit address word, and 0 represents an address words that is not hit.

In an embodiment, a state transition matrix of the sample addresses is obtained according to state transition probabilities, between a risk word and a non-risk word, of the address words contained in the training samples. In one or more embodiments of the specification, the state transition probability refers to the probability that state transition of an address word between two hidden states, i.e., a risk address and a non-risk address, may happen.

In the embodiments of the specification, training the hidden Markov model parameters according to the initial model and the observation sequences corresponding to the training samples to obtain a hidden Markov model may specifically comprise: according to the initial model and the observation sequences corresponding to the training samples, using a Baum-Welch algorithm to train the hidden Markov model parameters so as to obtain a hidden Markov model.

In addition, other data for training the hidden Markov model parameters can also be acquired, for example, $O=o_1 o_2 \ldots o_h \ldots o_{n-1} o_n$, wherein the sequence O is an address word sequence containing a hit risk country/region word, and $o_h$ is an address word to be labeled. Generally, it is possible to take n=10; an observation sequence is obtained according to 3 words before and after the address word in the context of $o_h$ to be labeled, wherein $S=s_1 s_2 \ldots s_h \ldots s_{n-1} s_n$ is the labeling vector corresponding to the address word sequence O, and represents the probabilities of the risk address being hit by various address words in the address word sequence; and then the hitting probabilities of the various address words form the labeling vector, wherein the labeling vector may be the initial labeling vector; $P(o_h, s_h | \lambda)$ indicates the probability that the address word sequence $o_h$ and its hit label $s_h$ are correct, and is used for selecting a needed hidden Markov model parameter $\lambda$; and then, the hidden Markov model parameter $\lambda$ is trained according to the above-mentioned parameter to obtain a hidden Markov model.

In an embodiment, an objective function of the model is defined as: $\arg\max P(o_h, s_h | \lambda)$, to facilitate the acquisition of a needed decision vector.

In the embodiments of the specification, for step S108, processing the observation sequence using a hidden Markov model obtained based on semantics learning before and after address words, to obtain a decision vector may specifically comprise: processing the observation sequence using the hidden Markov model obtained by semantics learning before and after address words, and a Viterbi algorithm, to obtain a decision vector, wherein the decision vector represents the probabilities of the risk address being hit by the various address words contained in the address word sequence. In addition, the decision vector may also represent the probabilities of the risk address being hit by various address words contained in the observation sequence corresponding to the address word sequence, and an address word not contained in the observation sequence may be directly labeled as 0.

For example, if an address word sequence [A, B, C, D, E, F] has a corresponding observation sequence [B, C, D], then an obtained decision vector may be represented as [0, 0.5, 1, 0.3, 0, 0].

In the embodiments of the specification, for step S110, making a classification decision on the decision vector may specifically comprise: making a classification decision on the decision vector using an SVM model obtained through training.

Generally, a decision vector is obtained by calculation through a hidden Markov model, and then a decision with binary or more classification is made on the decision vector;

and explanation is made below by mainly taking a binary classification decision as an example.

Figure 4:
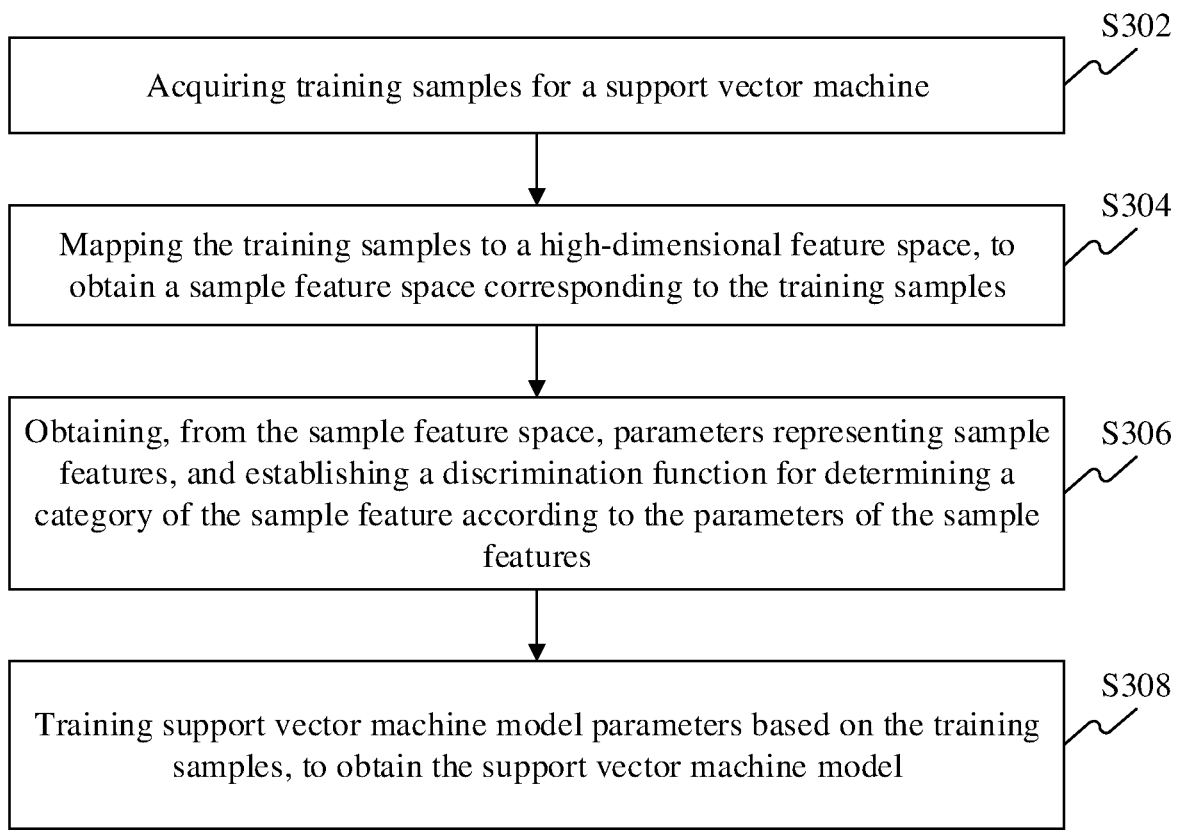
FIG. 4 is a flowchart of a modeling method for a support vector machine model, according to an embodiment.

FIG. 4 is a flowchart of a modeling method 300 for a support vector machine model, according to an embodiment. Referring to FIG. 4, the method 300 may include the following steps.

Step S302: acquiring training samples for a support vector machine;

Step S304: mapping the training samples of the support vector machine to a high-dimensional feature space, to obtain a sample feature space corresponding to the training samples of the support vector machine;

Step S306: acquiring, from the sample feature space, parameters representing sample features, and establishing a discrimination function for determining a category of the sample features according to the parameters of the sample features; and Step S308: training corresponding SVM model parameters in the discrimination function based on the training samples of the support vector machine, to obtain the SVM model.

The training samples for the support vector machine may be decision vectors corresponding to training samples obtained by training sample addresses through the above-mentioned hidden Markov model, or may be other to-be-discriminated data characterizing the input address.

In an embodiment, the SVM can map a decision vector address to a high-dimensional feature space by selecting a multi-power polynomial kernel function, and the expression is as follows:

$$\kappa(x, x_i) = ((x \cdot x_i) + 1)^d$$

The SVM is used to find the optimal classification hyperplane for each category of sample features and other features in the high-dimensional feature space of the sample address, a support vector set representing various sample features and the corresponding VC credibility thereof are obtained, and the discrimination function for determining the category of each feature is formed:

$$f(x) = \sum_{i=1}^{n} \alpha_i y_i \kappa(x, x_i)$$

In an embodiment, an SVM model parameter $\alpha_i$ is obtained by training based on a large amount of address data such as global address library data, to further optimize the support vector machine model.

By address matching learning based on semantic identification, a classification determination result of a risk address is obtained according to a matching result of each address word and the semantics before and after it, which can effectively identify risk addresses or forged risk addresses, and can avoid the misjudgment of risk-free addresses.

Figure 5:
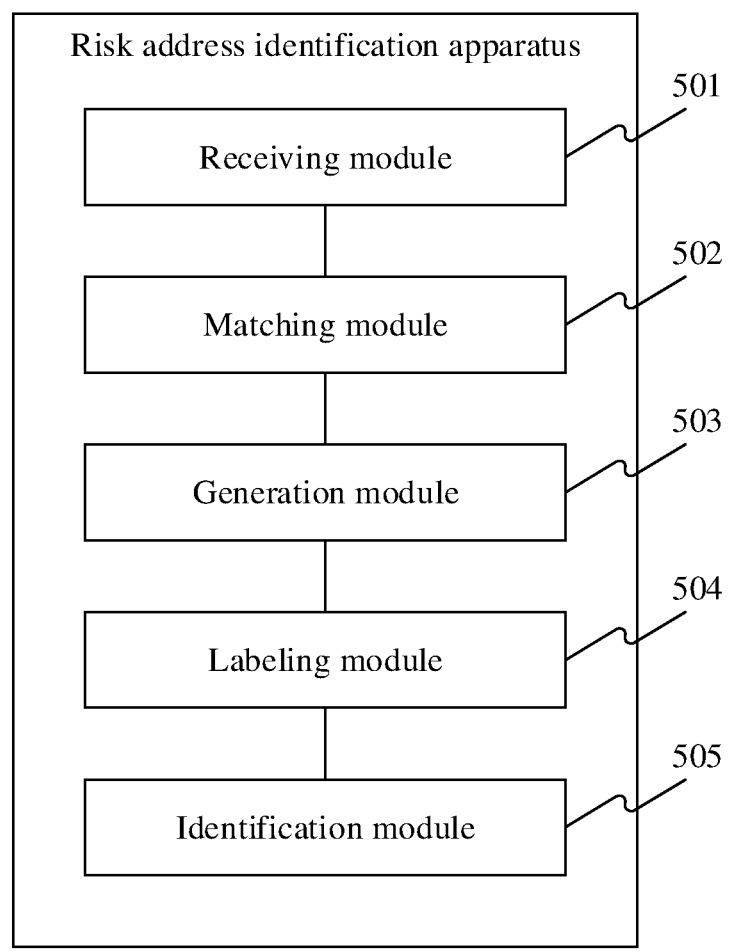
FIG. 5 is a schematic diagram of a risk address identification apparatus, according to an embodiment.

Embodiments of the specification further provide a risk address identification apparatus. FIG. 5 is a schematic diagram of a risk address identification apparatus 500 according to an embodiment. For example, the apparatus corresponds to the method 100 (FIG. 2), and may include:

a receiving module 501 for acquiring an address word sequence corresponding to an input address;

a matching module 502 for determining, in various address words contained in the address word sequence, an address word hitting a risk word corresponding to each risk address;

a generation module 503 for generating an observation sequence corresponding to the address word sequence according to the determined address word;

a labeling module 504 for processing the observation sequence using a hidden Markov model obtained based on semantics learning before and after address words, to obtain a decision vector, wherein the decision vector represents the probabilities of the risk address being hit by the various address words contained in the address word sequence; and an identification module 505 for identifying whether the input address is a risk address by making a classification decision on the decision vector.

Using the hidden Markov model obtained based on semantics learning before and after address words and the support vector machine model, a classification determination result of the input address is obtained according to the address word obtained after processing the input address and the semantics before and after it, which can effectively identify risk addresses or forged risk addresses, and can avoid the misjudgment of risk-free addresses. Therefore, problems in the prior art can be partially or completely solved.

In an embodiment, the receiving module 501 acquiring an address word sequence corresponding to an input address may comprise: the receiving module 501 receiving an input address; and performing data cleaning processing and word segmentation processing on the input address to obtain an address word sequence corresponding to the input address. Through further cleaning processing and word segmentation processing on the input address, a standardized address word sequence is obtained, so as to facilitate the labeling operation on the address word sequence in subsequent steps, which can improve the work efficiency of probability labeling of the determined address words in the address word sequence.

In an embodiment, the matching module 502 determining, in various address words contained in the address word sequence, an address word hitting a risk word corresponding to each risk address may comprise: the matching module 502 respectively matching the various address words in the address word sequence using risk words corresponding to each risk address; and if one of the address words is successfully matched, labeling same and determining same as an address word hitting a risk word corresponding to each risk address.

In an embodiment, the matching module 502 determining, in various address words contained in the address word sequence, an address word hitting a risk word corresponding to each risk address may further comprise: if there is no successfully matched address word, determining that the input address is not a risk address.

By labeling the address word through the matching module 502, quick pre-filtering of a risk input address and a risk-free input address can be performed, which can improve the work efficiency of the risk address identification.

In an embodiment, the generation module 503 generating an observation sequence corresponding to the address word sequence according to the determined address word may comprise: for the determined address word, respectively performing the following: generating an observation sequence corresponding to the address word sequence according to the address word and associated words of the address word in the address word sequence, wherein the associated words reflect the semantics before and after the address word in the address word sequence. Here, the semantics before and after the address word refers to a plurality of address words before and after, and associated with, the hit address word, and the number of associated address words may be two or three, where the associated address words may be address words associated continuously with the hit address word and may also be address words associated with and spaced apart from the hit address word.

In an embodiment, obtaining a hidden Markov model based on the semantics learning before and after address words comprises: extracting initial parameters according to predefined training samples, and establishing an initial model containing hidden Markov model parameters according to the initial parameters, wherein the training samples are risk addresses or non-risk addresses; generating observation sequences corresponding to the training samples according to address words contained in the training samples and the semantics before and after the address words; and training the hidden Markov model parameters according to the initial model and the observation sequences corresponding to the training samples to obtain a hidden Markov model.

For the hidden Markov model, the observation sequence consisting of the hit risk word and the semantics before and after the risk word is used to train the hidden Markov model parameters, so as to obtain the required hidden Markov model (HMM), which can improve the accuracy of input address risk identification by the hidden Markov model.

In an embodiment, the initial parameters include: an initial probability vector and a state transition matrix; and extracting initial parameters according to predefined training samples may comprise: based on a plurality of training samples, obtaining an initial probability vector by respectively performing probability labeling on the address words contained in the training samples; and obtaining a state transition matrix of the sample addresses according to state transition probabilities, between a risk word and a non-risk word, of the address words contained in the training samples. Here, a risk word is an address word contained in a risk address, a non-risk word is an address word contained in a non-risk address, and some address words can be both risk words and non-risk words.

In an embodiment, training the hidden Markov model parameters according to the initial model and the observation sequences corresponding to the training samples to obtain a hidden Markov model may specifically comprise: according to the initial model and the observation sequences corresponding to the training samples, using a Baum-Welch algorithm to train the hidden Markov model parameters so as to obtain a hidden Markov model.

It should be noted that during the modeling of the hidden Markov model, the quantity and scale of training sample addresses may affect the quality of the training result. When the global address library used for the training sample addresses is more comprehensive and has a wider coverage, the rate of identification while using the model will be vastly improved, and therefore, a great modeling effect can be achieved in the case of having enough training sample addresses.

In an embodiment, the labeling module 504 processing the observation sequence using a hidden Markov model obtained based on semantics learning before and after address words, to obtain a decision vector may comprise: processing the observation sequence using the hidden Markov model obtained by semantics learning before and after address words, and a Viterbi algorithm, to obtain a decision vector. The decision vector represents the probabilities of the risk address being hit by the various address words contained in the address word sequence.

In an embodiment, the identification module 505 making a classification decision on the decision vector may comprise: making a classification decision on the decision vector using a support vector machine (SVM) model obtained through training.

In an embodiment, obtaining a support vector machine model through training comprises: acquiring training samples for a support vector machine; mapping the training samples of the support vector machine to a high-dimensional feature space, to obtain a sample feature space corresponding to the training samples of the support vector machine; acquiring, from the sample feature space, parameters representing sample features, and establishing a discrimination function for determining a category of the sample features according to the parameters of the sample features; and training corresponding SVM model parameters in the discrimination function based on the training samples for the SVM, to obtain an SVM model.

The training samples may be the decision vector in the above-mentioned embodiments, or other to-be-discriminated data characterizing the input address.

Generally, for a decision vector calculated through the hidden Markov model, the SVM needs to be used to map the decision vector to a high-dimensional feature space and then make a binary classification decision. A classification decision can also be made on some decision vectors, which are easy to process, without mapping same to a high-dimensional feature space, for example, a linear classification decision can be made, which can reduce the computational difficulty and promote the processing speed.

Embodiments of the specification further provide an electronic device, comprising: at least one processor; and a memory in communication connection with the at least one processor, wherein the memory stores instructions executable by the at least one processor, the instructions being executed by the at least one processor to cause the at least one processor to: acquire an address word sequence corresponding to an input address; determine, in various address words contained in the address word sequence, an address word hitting a risk word corresponding to each risk address; generate an observation sequence corresponding to the address word sequence according to the determined address word; process the observation sequence using a hidden Markov model obtained based on semantics learning before and after address words, to obtain a decision vector, wherein the decision vector represents probabilities of the risk address being hit by the various address words contained in the address word sequence; and identify whether the input address is a risk address by making a classification decision on the decision vector.

Each of the above described modules may be implemented as software, or hardware, or a combination of software and hardware. For example, each of the above described modules may be implemented using a processor executing instructions stored in a memory. Also, for example, each the above described modules may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the described methods.

Figure 6:
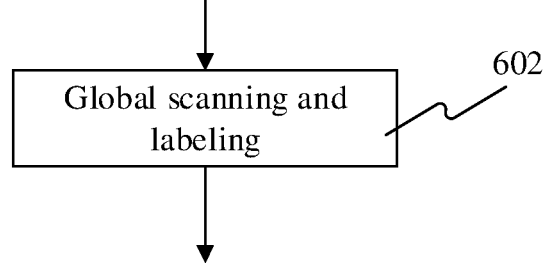
FIG. 6 is a flowchart of a risk address identification process that indicates that an address has no risk, according to an embodiment.
Figure 6:
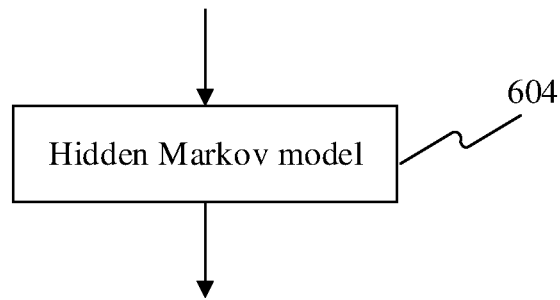
Figure 6:
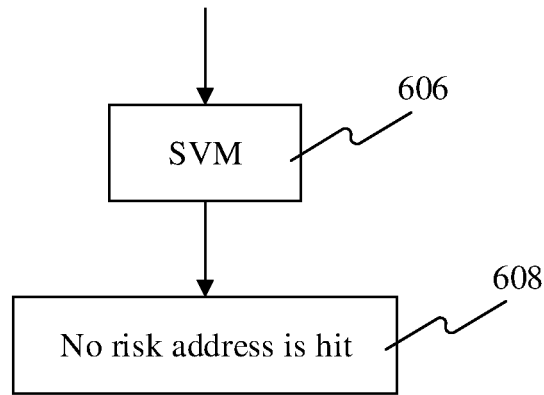

FIG. 6 is a flowchart of a risk address identification process 600 that indicates that an address has no risk, according to an embodiment. Referring to FIG. 6, the process 600 may include the following:

first, the text of an input address being: REPUBLICA DE SIRIA 7495 SANTA FE Santa Fe AR;

then, globally scanning and labeling the input address (602) as hitting a sanction address (country or city) word: SIRIA, and obtaining an initial labeling vector [0, 0, 1, 0, 0, 0, 0, 0, 0] of the input address, where the initial labeling vector is also the initial probability vector;

further, obtaining a decision vector [0.01, 0.02, 0.02, 0.02, 0.01, 0, 0, 0, 0] through a hidden Markov labeling model (604); and finally, the SVM classification model (606) making a decision that: the input address does not hit the sanction address (608), wherein the sanction address is the risk address in this embodiment.

Figure 7:
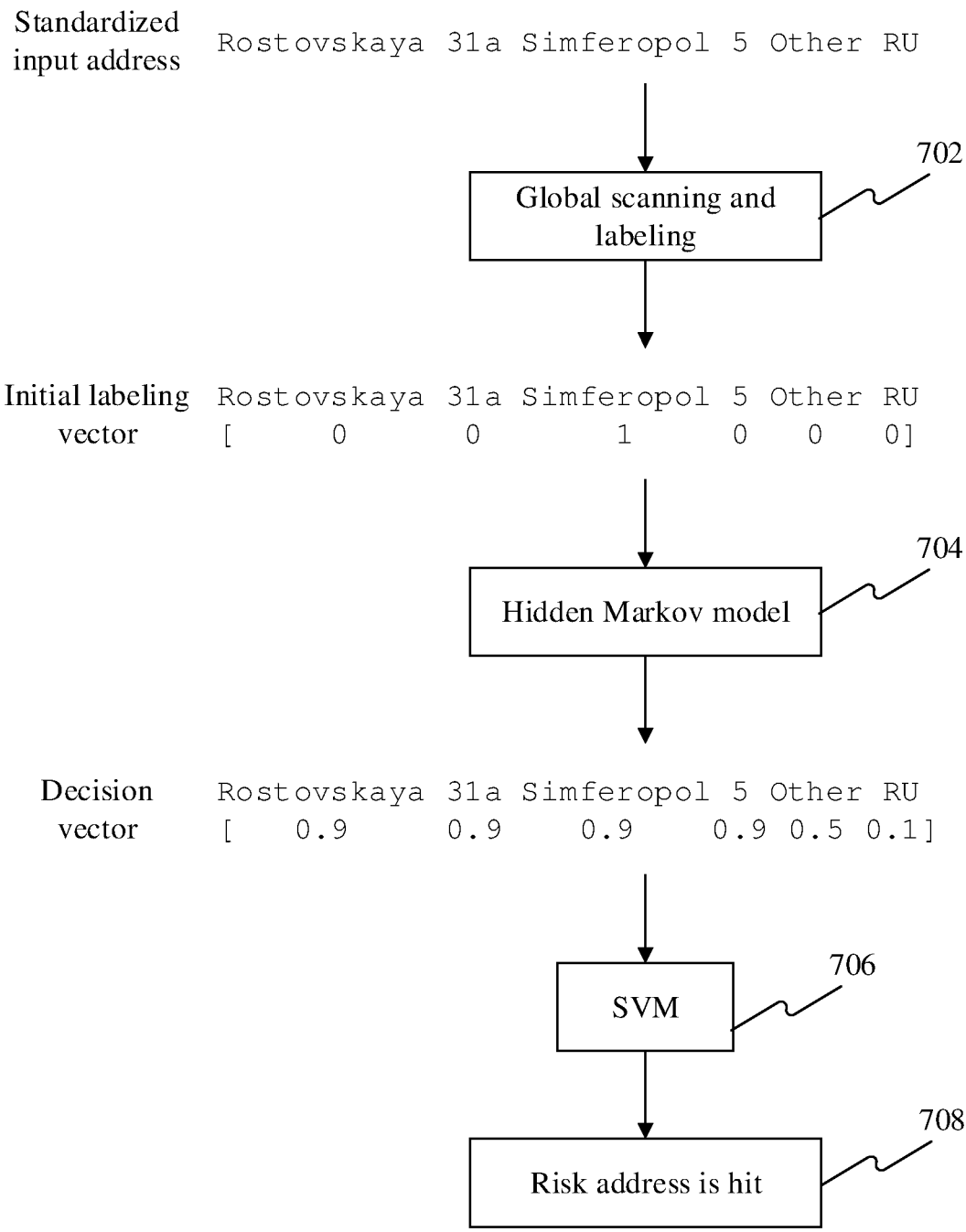
FIG. 7 is a flowchart of a risk address identification process that indicates that an address is risky, according to an embodiment.

FIG. 7 is a flowchart of a risk address identification process 700 that indicates that an address is risky, according to an embodiment Referring to FIG. 7, the process 700 may include the following:

first, the text of an input address being: Rostovskaya, 31a, Simferopol 5 Other RU:

then, globally scanning and labeling the input address (702) as hitting the sanction address (country or city) word: Simferopol, and obtaining an initial labeling vector [0, 0, 1, 0, 0] of the input address;

further, obtaining a decision vector [0.9, 0.9, 0.9, 0.9, 0.5, 0.1] through a hidden Markov labeling model (704); and finally, the SVM classification model (706) making a decision that: the input address hits the sanction address (708), wherein the sanction address is the risk address in this embodiment.

Figure 8:
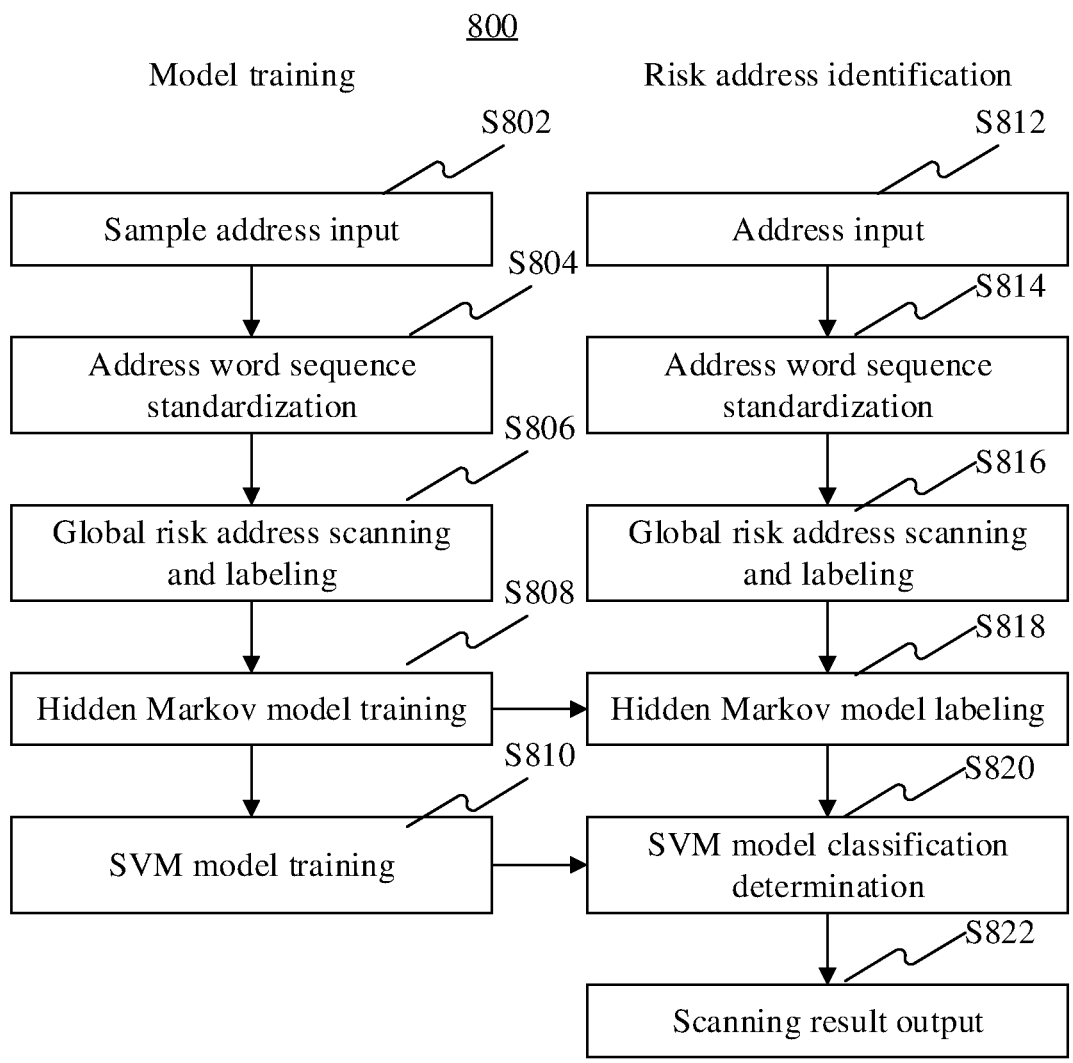
FIG. 8 is a flowchart of a modeling and identification method for risk address identification, according to an embodiment.

FIG. 8 is a flowchart of a modeling and identification method 800 for risk address identification, according to an embodiment. Referring to FIG. 8, the method 800 may include:

S802: when modeling the risk address identification model, performing parameter training, and first, acquiring a training address corpus as the sample addresses;

S804: cleaning the training address corpus and separating them into standardized address character strings as address word sequences;

S806: globally scanning, matching and labeling the input training address corpus, to obtain an initial labeling model and initial parameters;

S808: according to the initial labeling model, the hidden Markov model parameters are trained to obtain a needed hidden Markov model;

S810: parameters of the SVM are trained according to the decision vector output through the hidden Markov model, to obtain a needed SVM model;

S812: when performing risk address scanning and identification, an address is firstly input:

S814: standardization processing is performed on the input address;

S816: global risk address scanning and labeling are performed on the input address to obtain a labeled address word sequence, and further, an observation sequence is obtained based on the risk word and the semantics before and after it;

S818: risk probability calculation and labeling are performed on the address word sequence (the observation sequence) through the hidden Markov model to generate a decision vector;

S820: the SVM makes a binary classification decision according to the decision vector to determine whether the input address is a risk address;

S822: the result is output.

The hidden Markov model and the support vector machine are used to judge and identify the input address based on the risk address word and the semantics before and after it, and the accuracy of the identification can be effectively improved.

Figure 9:
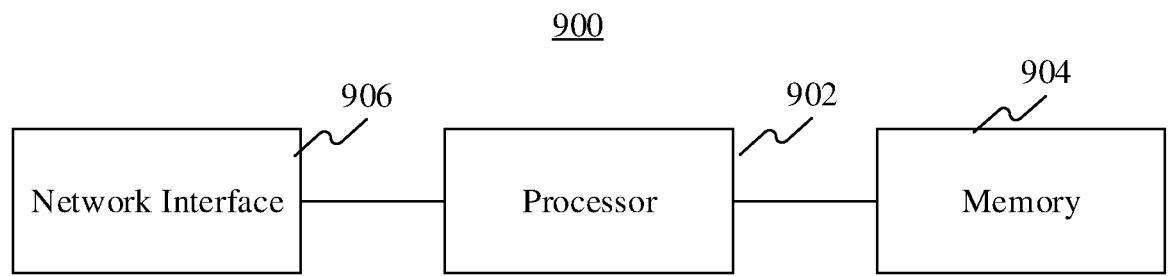
FIG. 9 is a schematic diagram of an electronic device, according to an embodiment.

FIG. 9 is a block diagram of an electronic device 900, according to an embodiment. For example, the electronic device 900 may include a processor 902, a memory 904, and a network interface 906.

The processor 902 may include one or more dedicated processing units, application-specific integrated circuits (ASICs), field-programmable gate arrays (FPGAs), or various other types of processors or processing units. The processor 902 is coupled with the memory 904 and is configured to execute instructions stored in the memory 904 to perform the above described methods.

The memory 904 may include a non-permanent memory, a random access memory (RAM) and/or a non-volatile memory (such as a read-only memory (ROM) or a flash memory (flash RAM)), etc. For example, the memory 904 stores instructions to perform the above described methods.

Exemplary embodiments of the specification are described above. In some cases, the actions or steps specified in the claims can be performed in a different order than those in the embodiments and can still achieve desired results. Additionally, the processes depicted in the drawings are not necessarily in a particular order or consecutive order as shown to achieve the desired results. In some implementations, multi-task processing and parallel processing are also possible or may be advantageous.

Various embodiments in the description are all described in a progressive manner. For the same or similar parts among the embodiments, reference can be made to one another. For each embodiment, the part thereof different from the other embodiments is mainly described. Particularly, for the apparatus, electronic device, computer-readable storage medium embodiments, reference can be made to the relevant description in the method embodiments.

The apparatus, electronic device and computer-readable storage medium in the embodiments of the specification correspond to the method. Therefore, the apparatus, electronic device and computer-readable storage medium also have the similar beneficial technical effects to those of the corresponding method.

Each of the above described methods, modules, models, and units may be implemented as software, or hardware, or a combination of software and hardware. For example, a Programmable Logic Device (PLD) (for example, a Field Programmable Gate Array (FPGA)) is such an integrated circuit, and logic functions thereof are determined by a user programming device. Designers program by themselves to integrate a digital system into a PLD, without having a chip manufacturer to design and manufacture a dedicated integrated circuit chip. Moreover, at present, the programming is mostly implemented using logic compiler software, instead of manually manufacturing an integrated circuit chip. The logic compiler software is similar to a software complier used for developing and writing a program, and original code before compiling also needs to be written in a specific programming language, which is referred to as a Hardware Description Language (HDL). There are many types of HDLs, such as ABEL (Advanced Boolean Expression Language), AHDL (Altera Hardware Description Language). Confluence, CUPL (Cornell University Programming Language), HDCal, JHDL (Java Hardware Description Language), Lava, Lola, MyHDL, PALASM, and RHDL (Ruby Hardware Description Language), among which VHDL (Very-High-Speed Integrated Circuit Hardware Description Language) and Verilog are most commonly used now. Those skilled in the art also should know that a hardware circuit for implementing the logic method procedure may be easily obtained only by slightly logically programming the method procedure using the above-described several hardware description languages and programming same into an integrated circuit.

A controller may be implemented in any suitable manner in the above described devices. For example, the controller may be in the form of a microprocessor or a processor, and a computer readable medium storing computer readable program codes (for example, software or firmware) executable by the (micro)processor, a logic gate, a switch, an Application Specific Integrated Circuit (ASIC), a programmable logic controller, and an embedded micro-controller. Examples of the controller include, but are not limited to, the following micro-controllers: ARC 625D, Atmel AT91SAM, Microchip PIC18F26K20, and Silicone Labs C8051F320. A memory controller may also be implemented as a part of a control logic of a memory. Those skilled in the art also know that, in addition to implementing the controller by pure computer readable program codes, the method steps may be logically programmed to enable the controller to implement the same function in the form of a logic gate, a switch, an application specific integrated circuit, a programmable logic controller and an embedded microcontroller. Therefore, such a controller may be considered as a hardware component, and apparatuses included therein for implementing various functions may also be considered as structures inside the hardware component. Alternatively, the apparatuses for implementing various functions may even be considered as both software modules for implementing the method and structures inside the hardware components.

The device, apparatus, modules or units illustrated in the above-described embodiments can be implemented by a computer chip or an entity, or implemented by a product having a specific function. A typical implementation device is a computer. For example, the computer may be a personal computer, a laptop computer, a cellular phone, a camera phone, a smart phone, a personal digital assistant, a media player, a navigation device, an email device, a game console, a tablet computer, a wearable device, or a combination of any of these devices.

For ease of description, the above-described apparatus is divided into various modules based on functions, and the modules are described separately. In an embodiment, functions of various modules can be implemented in one or more pieces of software and/or hardware.

Those skilled in the art should understand that the embodiments of the specification may be provided as a method, a device, or a computer program product. Therefore, the embodiments of the specification may be implemented in a form of a complete hardware embodiment, a complete software embodiment, or a embodiment combining software and hardware. Moreover, the embodiments of the specification may be in the form of a computer program product implemented on one or more computer-readable storage mediums (including, but not limited to, a magnetic disk memory, a CD-ROM, an optical memory and the like) including computer usable program codes therein.

The specification is described with reference to flowcharts and/or block diagrams of the method, device (system) and computer program product according to the embodiments of the present invention. It should be understood that computer program instructions may implement each process and/or block in the flowcharts and/or block diagrams and combinations of processes and/or blocks in the flowcharts and/or block diagrams. These computer program instructions may be provided to a general-purpose computer, a special-purpose computer, an embedded processor, or a processor of other programmable data processing devices to produce a machine, so that an apparatus for implementing a specified function in one or more processes in the flowcharts and/or in one or more blocks in the block diagrams is produced by the instructions executed by the processor of the computer or other programmable data processing devices.

These computer program instructions may also be stored in a computer-readable memory that can guide a computer or other programmable data processing devices to operate in a particular manner, such that the instructions stored in the computer-readable memory produce a manufactured product, including an instruction apparatus. The instruction apparatus implements a function specified in one or more processes in the flowcharts and/or in one or more blocks in the block diagrams.

These computer program instructions may also be loaded onto a computer or other programmable data processing devices, such that a series of operation steps are performed on the computer or other programmable devices, thus producing computer-implemented processing. Therefore, the instructions executed on the computer or other programmable devices provide steps for implementing a function specified in one or more processes in the flowcharts and/or in one or more blocks in the block diagrams.

The computer-readable medium includes permanent and non-permanent media as well as removable and non-removable media, and may store information by any method or technology. The information may be a computer-readable instruction, a data structure, a module of a program, or other data. An example of the storage medium of a computer includes, but is not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible to the computing device. According to the definition herein, the computer-readable medium does not include a computer-readable transitory medium, such as modulated data signals and carriers.

It should be further noted that terms "include." "comprise," or any other variations thereof are intended to cover non-exclusive inclusion, so that a process, method, article or device including a series of elements not only includes the elements, but also includes other elements not expressly listed, or further includes elements inherent to the process, method, article or device. In the absence of more limitations, an element defined by "including a/an . . . " does not exclude that the process, method, article or device including the element further has other identical elements.

The above described methods may be implemented by instructions executed by a computer, for example, a program module. Generally, the program module includes a routine, a program, an object, a component, a data structure, and the like for executing a specific task or implementing a specific abstract data type. The above described methods may also be practiced in distributed computing environments. In the distributed computing environments, a task is executed by a remote processing device connected through a communications network. In the distributed computing environments, the program module may be located in a local and remote computer-readable storage medium, including a storage device.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. A risk address identification method, comprising:
   acquiring an address word sequence corresponding to an input address;
   determining an address word in the address word sequence, the determined address word matching a risk word corresponding to a risk address;
   generating an observation sequence corresponding to the address word sequence according to the determined address word;
   processing the observation sequence to obtain a decision vector, wherein the decision vector represents probabilities of the risk address being matched by address words contained in the address word sequence; and
   identifying whether the input address is a risk address by making a classification decision on the decision vector.

2. The method according to claim 1, wherein acquiring an address word sequence corresponding to an input address comprises:
   receiving an input address;
   performing data cleaning processing and word segmentation processing on the input address to obtain the address word sequence corresponding to the input address.

3. The method according to claim 1, wherein determining an address word in the address word sequence matching a risk word corresponding to a risk address comprises:
   respectively matching the address words in the address word sequence using risk words corresponding to the risk address; and
   if one of the address words is successfully matched, labeling the matched address word and determining the matched address word as an address word matching a risk word corresponding to the risk address.

4. The method according to claim 3, wherein determining an address word in the address word sequence matching a risk word corresponding to a risk address further comprises:
   if there is no successfully matched address word, determining that the input address is not a risk address.

5. The method according to claim 3, wherein generating an observation sequence corresponding to the address word sequence according to the determined address word comprises:
   generating an observation sequence corresponding to the address word sequence according to the determined address word and associated words of the determined address word in the address word sequence, wherein the associated words reflect semantics before and after the determined address word in the address word sequence.

6. The method according to claim 1, further comprising:
   extracting initial parameters according to predefined training samples, and establishing an initial model containing hidden Markov model parameters according to the initial parameters, wherein the training samples are risk addresses or non-risk addresses;
   generating observation sequences corresponding to the training samples according to address words contained in the training samples and semantics before and after the address words; and
   training the hidden Markov model parameters according to the initial model and the observation sequences corresponding to the training samples to obtain a hidden Markov model.

7. The method according to claim 6, wherein the initial parameters comprise: an initial probability vector and a state transition matrix; and extracting initial parameters according to predefined training samples comprises:
   based on a plurality of predefined training samples, obtaining an initial probability vector by respectively performing probability labeling on address words contained in the training samples; and
   obtaining a state transition matrix of the sample addresses according to state transition probabilities, between a risk word and a non-risk word, of the address words contained in the training samples.

8. The method according to claim 6, wherein training the hidden Markov model parameters according to the initial model and the observation sequences corresponding to the training samples to obtain the hidden Markov model comprises:
   according to the initial model and the observation sequences corresponding to the training samples, using a Baum-Welch algorithm to train the hidden Markov model parameters to obtain the hidden Markov model.

9. The method according to claim 6, wherein processing the observation sequence to obtain a decision vector comprises:
   processing the observation sequence using the hidden Markov model and a Viterbi algorithm, to obtain the decision vector.

10. The method according to claim 1, wherein making a classification decision on the decision vector comprises:
    making a classification decision on the decision vector using a support vector machine model obtained through training.

11. The method according to claim 10, wherein obtaining a support vector machine model through training comprises:
    acquiring training samples for a support vector machine;
    mapping the training samples of the support vector machine to a high-dimensional feature space, to obtain a sample feature space corresponding to the training samples of the support vector machine;
    acquiring, from the sample feature space, parameters representing sample features, and establishing a discrimination function for determining a category of the sample features according to the parameters of the sample features; and
    training corresponding support vector machine parameters in the discrimination function based on the training samples of the support vector machine, to obtain the support vector machine model.

12. An electronic device, comprising:
    a processor; and
    a memory for storing instructions executable by the processor;
    wherein the processor is configured to:
    acquire an address word sequence corresponding to an input address;
    determine an address word in the address word sequence, the determined address word matching a risk word corresponding to a risk address;

generate an observation sequence corresponding to the address word sequence according to the determined address word;

process the observation sequence to obtain a decision vector, wherein the decision vector represents probabilities of the risk address being matched by address words contained in the address word sequence; and identify whether the input address is a risk address by making a classification decision on the decision vector.

13. The device according to claim 12, wherein in acquiring an address word sequence corresponding to an input address, the processor is further configured to:

receive an input address; and perform data cleaning processing and word segmentation processing on the input address to obtain the address word sequence corresponding to the input address.

14. The device according to claim 12, wherein in determining an address word in the address word sequence matching a risk word corresponding to a risk address, the processor is further configured to:

respectively match the address words in the address word sequence using risk words corresponding to the risk address; and if one of the address words is successfully matched, labeling the matched address word and determining the matched address word as an address word matching a risk word corresponding to the risk address.

15. The device according to claim 14, wherein in determining an address word in the address word sequence matching a risk word corresponding to a risk address, the processor is further configured to:

if there is no successfully matched address word, determine that the input address is not a risk address.

16. The device according to claim 14, wherein in generating an observation sequence corresponding to the address word sequence according to the determined address word, the processor is further configured to:

generate an observation sequence corresponding to the address word sequence according to the determined address word and associated words of the determined address word in the address word sequence, wherein the associated words reflect semantics before and after the determined address word in the address word sequence.

17. The device according to claim 12, wherein the processor is further configured to:

extract initial parameters according to predefined training samples, and establish an initial model containing hidden Markov model parameters according to the initial parameters, wherein the training samples are risk addresses or non-risk addresses;

generate observation sequences corresponding to the training samples according to address words contained in the training samples and semantics before and after the address words; and train the hidden Markov model parameters according to the initial model and the observation sequences corresponding to the training samples to obtain a hidden Markov model.

18. The device according to claim 17, wherein the initial parameters comprise: an initial probability vector and a state transition matrix; and in extracting initial parameters according to predefined training samples, the processor is further configured to:

based on a plurality of predefined training samples, obtain an initial probability vector by respectively performing probability labeling on address words contained in the training samples; and obtain a state transition matrix of the sample addresses according to state transition probabilities, between a risk word and a non-risk word, of the address words contained in the training samples.

19. The device according to claim 17, wherein in training the hidden Markov model parameters according to the initial model and the observation sequences corresponding to the training samples to obtain the hidden Markov model, the processor is further configured to:

according to the initial model and the observation sequences corresponding to the training samples, use a Baum-Welch algorithm to train the hidden Markov model parameters to obtain the hidden Markov model.

20. The device according to claim 17, wherein in processing the observation sequence to obtain a decision vector, the processor is further configured to:

process the observation sequence using the hidden Markov model and a Viterbi algorithm, to obtain a decision vector.

21. The device according to claim 12, wherein in making a classification decision on the decision vector, the processor is further configured to:

make a classification decision on the decision vector using a support vector machine model obtained through training.

22. The device according to claim 21, wherein in obtaining a support vector machine model through training, the processor is further configured to:

acquire training samples for a support vector machine;

map the training samples of the support vector machine to a high-dimensional feature space, to obtain a sample feature space corresponding to the training samples of the support vector machine;

acquire, from the sample feature space, parameters representing sample features, and establishing a discrimination function for determining a category of the sample features according to the parameters of the sample features; and train corresponding support vector machine model parameters in the discrimination function based on the training samples of the support vector machine, to obtain the support vector machine model.

23. A computer-readable storage medium storing thereon a computer program that, when executed by a processor of a device, causes the device to perform a risk address identification method, the method comprising:

acquiring an address word sequence corresponding to an input address;

determining an address word in the address word sequence, the determined address word matching a risk word corresponding to a risk address;

generating an observation sequence corresponding to the address word sequence according to the determined address word;

processing the observation sequence to obtain a decision vector, wherein the decision vector represents probabilities of the risk address being matched by address words contained in the address word sequence; and identifying whether the input address is a risk address by making a classification decision on the decision vector.

* * * * *